United States Patent
Reddy et al.

(10) Patent No.: US 10,140,462 B2
(45) Date of Patent: Nov. 27, 2018

(54) STACKABLE FILE SYSTEM WITH USER SPACE POLICY MANAGEMENT

(71) Applicant: Qualcomm Innovation Center, Inc., San Diego, CA (US)

(72) Inventors: Nikhilesh Reddy, San Diego, CA (US); Richard Patrick, San Diego, CA (US); Robert C. Coleman, San Diego, CA (US)

(73) Assignee: QUALCOMM Innovation Center, Inc., San Diego, CA (US)

( * ) Notice: Subject to any disclaimer, the term of this patent is extended or adjusted under 35 U.S.C. 154(b) by 232 days.

(21) Appl. No.: 15/160,201

(22) Filed: May 20, 2016

(65) Prior Publication Data
US 2016/0342804 A1 Nov. 24, 2016

Related U.S. Application Data

(60) Provisional application No. 62/165,055, filed on May 21, 2015.

(51) Int. Cl.
*G06F 21/62* (2013.01)

(52) U.S. Cl.
CPC .................. *G06F 21/6218* (2013.01)

(58) Field of Classification Search
CPC .. G06F 21/62; G06F 21/6209; G06F 21/6218; G06F 21/6227; G06F 21/6236; G06F 21/6281; G06F 21/78
See application file for complete search history.

(56) References Cited

U.S. PATENT DOCUMENTS

| | | | | |
|---|---|---|---|---|
| 6,032,216 A * | 2/2000 | Schmuck | .................. | G06F 9/52 707/999.01 |
| 9,547,655 B1 * | 1/2017 | Wang | ................. | G06F 17/30088 |
| 2003/0037252 A1 * | 2/2003 | Abrams | .................. | G06F 21/57 726/23 |
| 2005/0060568 A1 * | 3/2005 | Beresnevichiene | ..... | G06F 21/10 726/26 |
| 2005/0273858 A1 * | 12/2005 | Zadok | ..................... | G06F 21/50 726/24 |

(Continued)

FOREIGN PATENT DOCUMENTS

EP    2835758 A1    11/2015

OTHER PUBLICATIONS

Bartolini et al., AcOS: an Autonomic Management Layer Enhancing Commodity Operating Systems, 9 pages (Year: 2012).*

(Continued)

*Primary Examiner* — Hadi S Armouche
*Assistant Examiner* — Huan V Doan
(74) *Attorney, Agent, or Firm* — Neugeboren O'Dowd PC

(57) ABSTRACT

A computing device and method for managing file access control policies on a computing device are disclosed. The method includes maintaining file-access policies in user space, receiving, at a kernel level, from a user in user space, a request to access a file, and directing the request from the kernel level to a file-policy manager in user space. At least one of the of the file-access policies is enforced in user space with the file-policy manager to grant or deny access to the file, and file operations are performed on the file using only kernel-level calls when access to the to the file is granted.

11 Claims, 6 Drawing Sheets

(56) References Cited

U.S. PATENT DOCUMENTS

| | | | |
|---|---|---|---|
| 2007/0110044 A1* | 5/2007 | Barnes | G06F 17/30091 370/360 |
| 2008/0148355 A1* | 6/2008 | Archer | G06F 21/6218 726/3 |
| 2009/0327635 A1* | 12/2009 | Iyengar | G06F 21/10 711/163 |
| 2012/0036370 A1 | 2/2012 | Lim et al. | |
| 2013/0036448 A1* | 2/2013 | Aciicmez | G06F 21/6218 726/1 |
| 2015/0058997 A1* | 2/2015 | Lee | G06F 9/45558 726/26 |

OTHER PUBLICATIONS

Liu et al., Using the user space file system to protect file, 4 pages (Year: 2010).*

Sipek et al., Kernel Support for Stackable File Systems, 8 pages (Year: 2010).*

\* cited by examiner

STACKABLE FILE SYSTEM WITH USER SPACE POLICY MANAGEMENT

CLAIM OF PRIORITY UNDER 35 U.S.C. § 119

The present application for patent claims priority to Provisional Application No. 62/165,055 entitled "OVERLAY FILE SYSTEM WITH USERSPACE POLICY MANAGEMENT" filed May 21, 2015, and assigned to the assignee hereof and hereby expressly incorporated by reference herein.

BACKGROUND

I. Field of the Disclosure

The technology of the disclosure relates generally to file management, and more particularly to file system policy management.

II. Background

Traditional UNIX file protection provides read, write, and execute permissions for the three user classes: file owner, file group, and other. But the protection actually provided depends on the type of file system that is implemented. Some file systems such as file allocation table (FAT) systems do not support such permissions at all. There are a large number of cases where this policy is not really enough and might need to simply add additional checks or automatically enforce permissions on certain files or directories. So there is a need for an additional layer to provide the same view or add to the current file system without actually modifying the file system itself.

On ANDROID-based devices, an external SD card and the emulated internal SD card are mounted using a file-system-in-user-space (FUSE) file system. This allows ANDROID-based devices to enforce special policies for these mount points. But this comes at a cost of performance because FUSE file systems require that all operations go through user space, and thus, every read and write needs to make six context switches to complete. Benchmarking studies have shown that this approach may be slower than actually reading/writing to the lower file system.

Original equipment manufacturers have developed file systems that allow the entire policy and file operations to be part of the kernel, and thus, these systems can achieve very close to native file system performance while still adding policy and other enforcements. But the simplicity of user space management is lost, and there is a large overhead of maintaining policy in the kernel because any change to policy requires kernel changes.

SUMMARY

Embodiments disclosed herein address the above stated needs by providing a method for managing file access control policies on a computing device. The method includes receiving, at a kernel level, from a user in user space, a request to access a file, and directing the request from the kernel level to a file-policy manager in user space. A file-access policy is enforced with the file-policy manager to grant or deny access to the file, and file operations are performed on the file using only kernel-level calls when access to the file is granted.

Another aspect may be characterized as a computing device that includes at least one storage device configured to store files, and a kernel-level file system configured to enable operations on the stored files. At least one application is configured to send a request for access to one or more of the stored files, and a stackable policy file system is configured to operate at the kernel-level and redirect the request for access to user-space. The computing device also includes a file-policy manager configured to receive the request for access in user-space and enforce file-access policies in user space to grant or deny access to the stored files and provide a grant-indicator to enable the application to perform input/output operations on the one or more files with the kernel-level file system without communicating with the user space.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
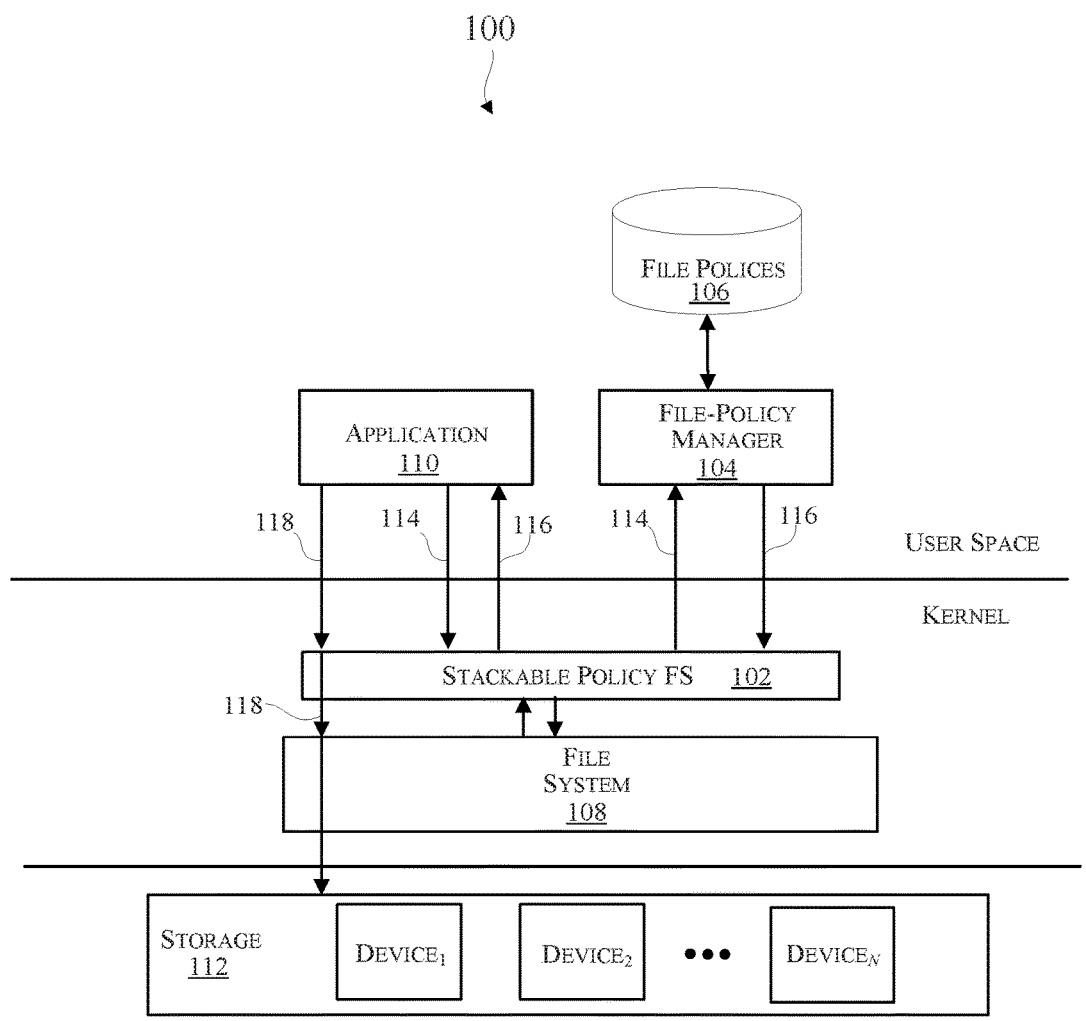
FIG. 1 is a block diagram depicting an embodiment described herein.

Referring to FIG. 1, shown is a block diagram of a computing device 100 that implements an exemplary file-system-policy management system. The computing device 100 may be realized by computing devices such as smart phones, tablets, netbooks, etc. As shown, the computing device 100 includes a user space portion and a kernel portion. Although the methodologies described herein are generally applicable to a variety of different types of operating systems and user space environments, for exemplary purposes, embodiments are described herein in the context of a modified LINUX kernel and modified ANDROID user space framework.

As shown, a kernel-level stackable policy file system (stackable policy FS) 102 is utilized with a file-policy manager 104 residing in user space. According to an aspect, policy is enforced by the file-policy manager 104 in user space while time consuming input/output (I/O) operations (such as and reads and writes) are performed at the kernel level without utilizing user space constructs. In the embodiment depicted in in FIG. 1 for example, file policies are maintained in a policy store 106 in user space, and open and create calls propagate through the file-policy manager 104, but a high level of performance is still maintained because read and write operations go directly to the kernel-level file system 108. Also depicted in FIG. 1 is an application 110 that resides in user space and storage 112 at a hardware level.

The application 110 is representative of any of a variety of processes that reside in user space, and each process may have a user ID and one or more group IDs. The application 110, for example, may be a gaming application, utility application, education application, entertainment application etc. The kernel-level file system 108 may be realized by, for example, a fourth extended file system (EXT4), file allocation table (FAT), or a network file system (NFS). As shown, the storage 112 may include N storage devices that each may be either a volatile or non-volatile storage device. The volatile type of storage devices may include random access memory (RAM) and the non-volatile storage devices may include flash memory (e.g., NAND type flash memory), removable flash memory (e.g., an SD card), or a network file system.

The stackable policy FS 102 generally operates to receive file access requests 114 from the application 110, and send the requests 114 as redirected requests 114 to the file-policy manager 104 that resides in user space. Requests 114 that may require a policy check, for example, may be an open call, a create request, an open directory call, lookup/stat, or a request to set an attribute. Although some requests 114 may not traditionally require policy checks, an aspect of the present embodiment is that it enables the creation of dynamic file policies that may be customized and dynamically updated by a user and stored in the policy store 106.

For example, an operator of the computing device 100 may create file-access policies that enable a user to access particular image files created within the last 24 hours while prohibiting access to other image files. As another example, a particular application developer may create policies to enable multiple applications (created by the developer) to access particular files while precluding other applications from accessing the files. Some examples of request types where file-access policies may be enforced are open, create, open-directory, set-attribute, and lookup/stat requests.

Upon receiving a redirected request 114, the file-policy manager 104 grants or denies the request by determining whether the stored file policies in the policy store 106 allow or prohibit the requested operation. The file-policy manager 104 then sends a response 116 (e.g., a grant indicator or denial indicator) that is received and routed by the stackable policy FS 102 back to the application 110. For example, the response may be a simple Boolean true or false indicator that indicates whether the request 114 is granted or denied, respectively.

If a request 114 is granted, the stackable policy FS 102 enables I/O requests 118 to pass through the stackable policy file system 102 to the kernel-level file system 108. In other words, the application 110 may then communicate with the kernel level directly without doing a policy check to perform a requested I/O action.

Granted file operations that pass through to the stackable policy FS 108 may include, for example, read requests, write requests, memory-mapped I/O, readdir, seekdir, seek, and an input/output control operation. Thus, the file-policy manager 104 only performs an initial policy check to enforce the file access policies and is not involved in the I/O requests 118 for file operations. As a consequence, file operations in the present embodiment, such as read and write requests, may be performed in a fraction of the time that the operations take in connection with the prior art FUSE approach.

In many implementations, the file-policy manager 104 may be realized as a background daemon that operates in the background without being readily apparent to an operator of the computing device 100. The file-policy manager 104 may be implemented as library may be shared by multiple processes. The file-policy manager 104 may also be implemented by a dynamically linked library.

The stackable policy file system 102 may be realized by modifying the LINUX kernel to function as describe herein. Although not shown for simplicity, those of ordinary skill in the art will appreciate that a LINUX virtual file system (VFS) exists within the kernel above the stackable policy FS 102.

Figure 2:
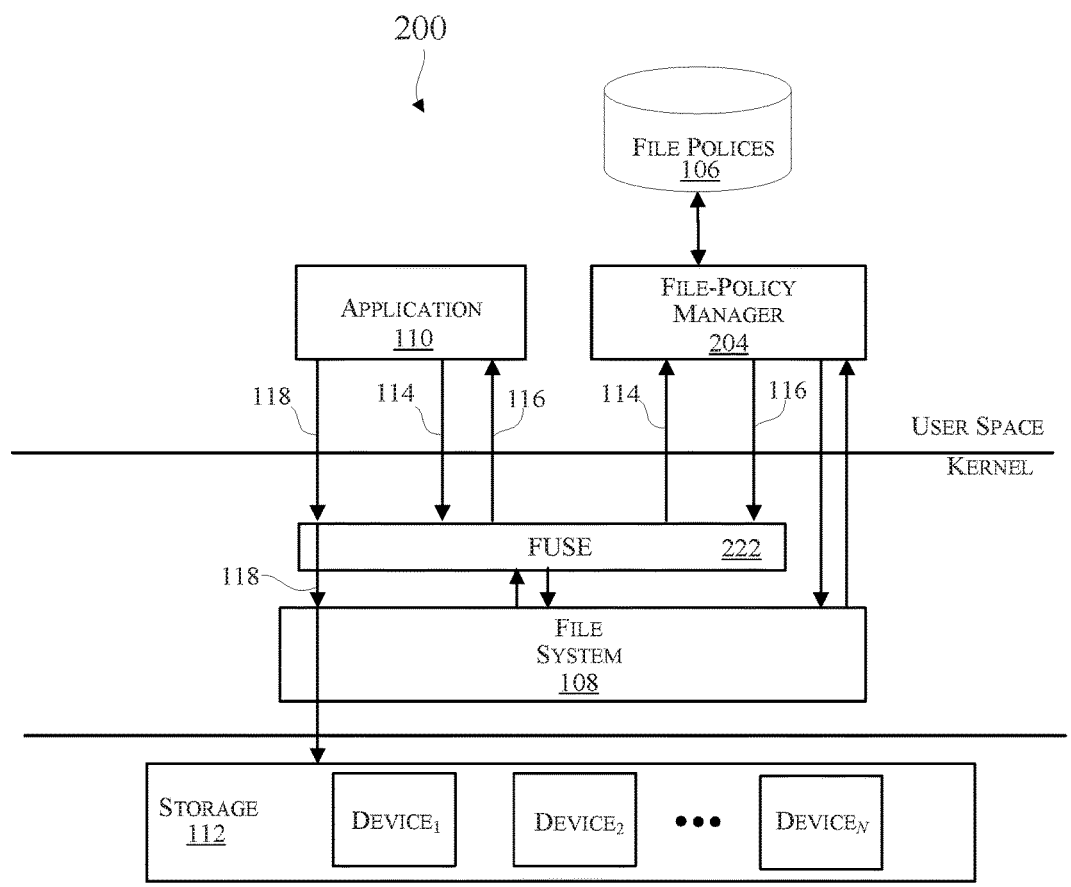
FIG. 2 is a block diagram depicting another embodiment.

Referring next to FIG. 2, shown is another embodiment of a computing device 200. As shown, in this embodiment the user space policy enforcement and direct-kernel I/O request functionality described with reference to FIG. 1 is implemented by extending and modifying FUSE constructs known in the art. More specifically, the file-policy manager 204 may be implemented by modifying the FUSE daemon that is known in the art, and the kernel-level FUSE module 222 known in the art is extended to capture lower-level file descriptors. Again the virtual file system (VFS) that is inherent to the LINUX kernel is not shown for clarity, but the VFS is interposed between the application 110 and FUSE 222 as discussed further herein.

Figure 3:
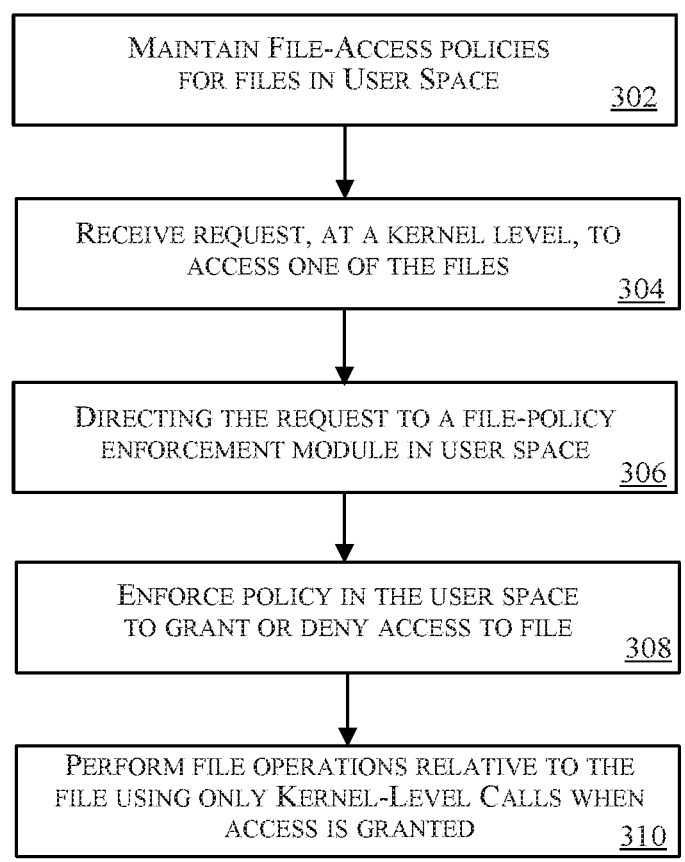
FIG. 3 is a method that may be traversed in connection with embodiments described herein.

Referring next to FIG. 3, shown is a flowchart depicting a method that may be traversed in connection with the embodiments described with reference to FIGS. 1 and 2. While referring to FIG. 3, simultaneous reference is made to FIGS. 4 and 5, which depict communication sequences in connection with the embodiments shown in FIGS. 1 and 2, respectively. As shown, file access policies relative to files in the storage 112 are maintained in user space in the policy store 106 (Block 302), and when a request to access one of the files is received at the kernel level (e.g., by the stackable policy FS 102 or FUSE module 222)(Block 304), the request is directed to the file-policy manager 104, 204 in user space (Block 306) where policy is enforced in user space to grant or deny access to the file (Block 308).

Figure 4:
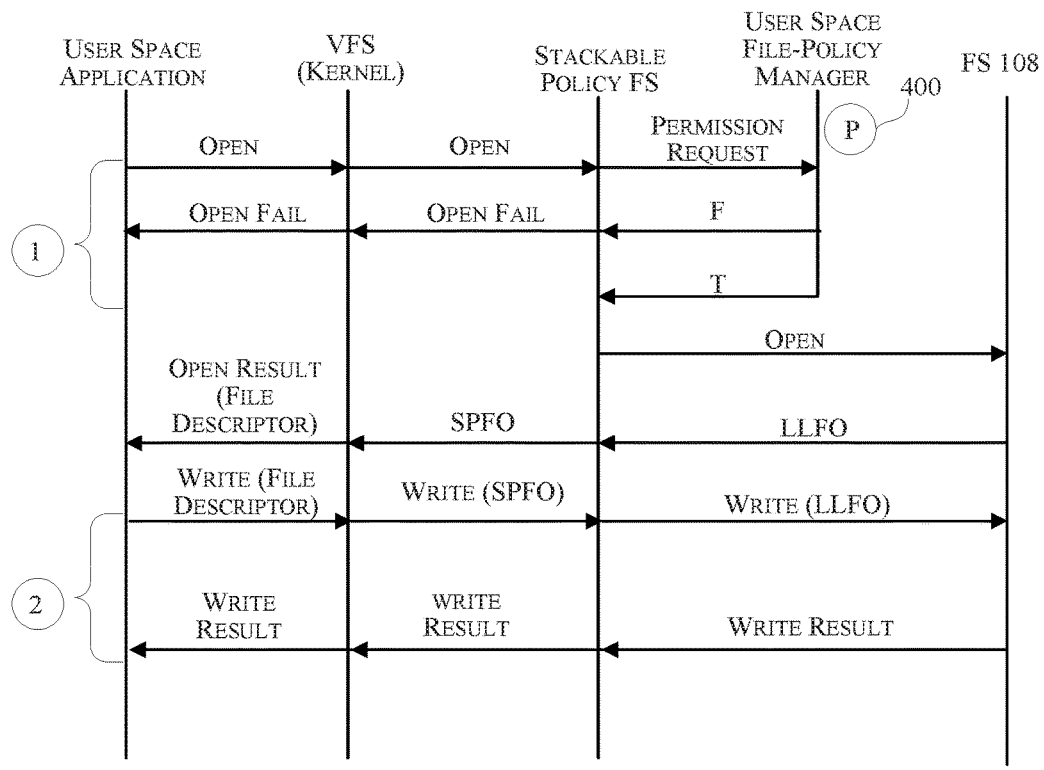
FIG. 4 is a diagram depicting communication flow that occurs in connection with the embodiment depicted in FIG. 1 in accord with the method shown in FIG. 3.

Referring briefly to FIG. 4, shown is a communication sequence that may occur in connection with the embodiment depicted in FIG. 1. While referring to FIG. 4, reference is also made to FIG. 7, which depicts aspects of results of the method depicted in FIG. 4. As shown, the request and policy enforcement is shown as step 1 and the communications that are carried out in connection with I/O activity are shown as step 2. When a request (e.g., from a process associated with the application 110) to access the file is received by the stackable policy FS 102, the request is directed to the file-policy manager 104 in user space where policy enforcement 400 is performed. In the depicted embodiment, policy enforcement is either granted (as shown by the path labeled "T") or denied (as shown by the path labeled "F").

As shown, if the request is granted, an "open" file operation request is made directly from the stackable policy FS 102 to the file system 108, and the file system 108 returns a lower-level file object reference (LLFO-reference) that points to the lower-level file object. In turn, the stackable policy FS 102 provides a stackable policy file object reference (SPFO-reference) that points to a stackable-policy file object (SPFO object). VFS then places the SPFO-reference in a file table associated with the process of the application 110. VFS also provides an indication of the open result to the application 110 and returns an index of an entry in the file table as a file descriptor (e.g., an integer between 0 and N) so the application 110 may perform I/O operations on the file object using the file descriptor. In the example depicted in FIG. 7, the SPFO-reference is indexed by the integer 0; thus the application 110 uses 0 as the file descriptor. One of ordinary skill in the art recognizes that the references described herein (e.g., SPFO-reference and LLFO-references) are pointers (e.g., addresses) to corresponding file objects (e.g., the SPFO and LLFO). In the example, shown in FIG. 7, the SPFO-reference is stored among other references in the process file table for a process associated with the application 110.

Figure 7:
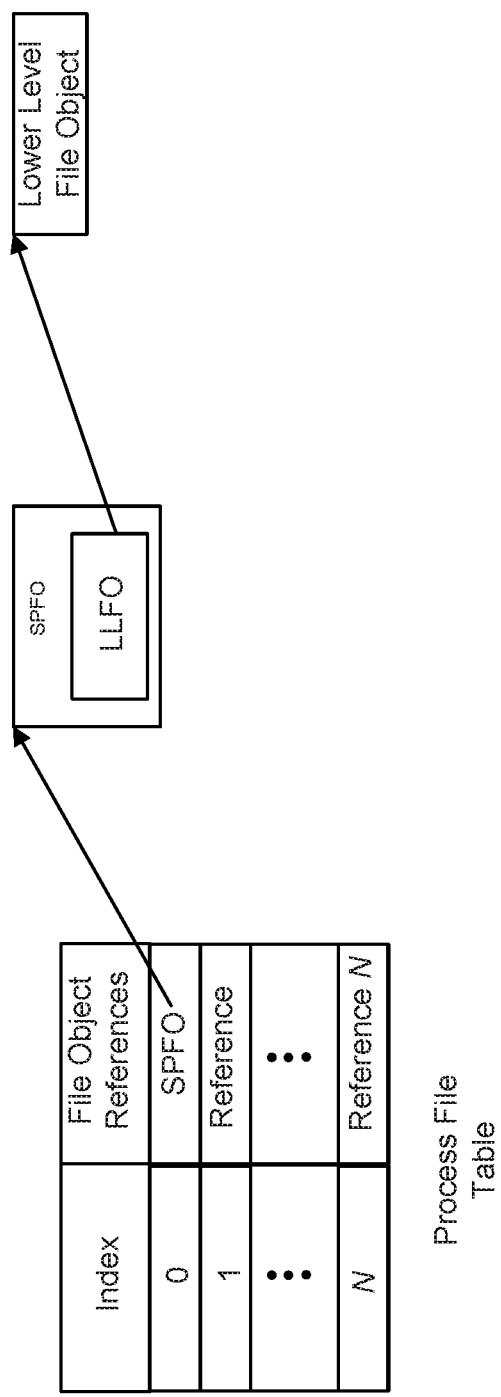
FIG. 7 is a drawing depicts resultant aspects of embodiments disclosed herein.

As shown in step 2 of FIG. 4, when performing file operations (e.g., read requests, write requests, memory-mapped I/O, readdir, seekdir, seek, and an input/output control operation), only kernel-level calls are utilized. As shown in FIG. 4, when a write request with the file descriptor is sent to the VFS, the VFS uses the file descriptor as an index to obtain the SPFO-reference and redirects the write request to the SPFO created by the stackable policy FS 102, which in turn, redirects the write request (along with the LLFO-reference) to the file system 108; thus avoiding interaction with the file-policy manager 104 in user space. As shown in FIG. 7, in connection with the write request, a process may use the file descriptor 0 as an index to the SPFO-reference in the process file table associated with the application 110. As shown, the SPFO-reference points to the stackable policy file system object (SPFO) (created by the stackable policy FS 102) where the LLFO-reference is located. As shown in FIG. 4, the write result from the file system 108 is then propagated back to the application 110 via the stackable policy FS 102 and the VFS.

Figure 5:
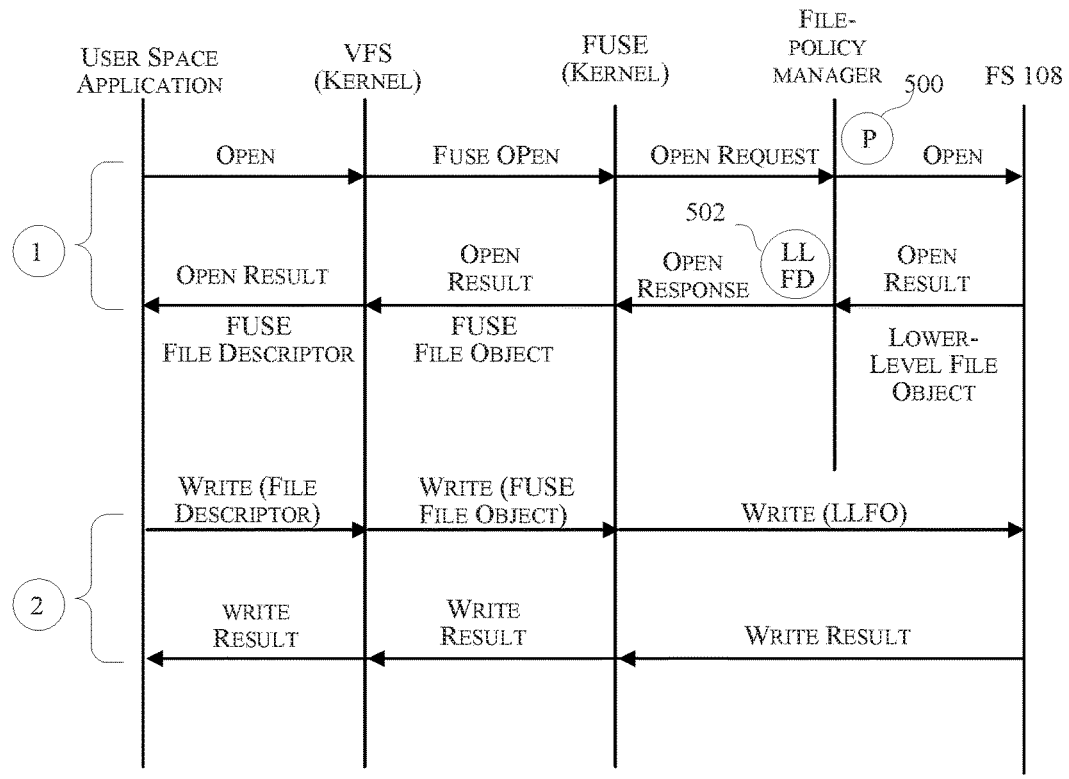
FIG. 5 is a diagram depicting communication flow that occurs in connection with the embodiment depicted in FIG. 2 in accord with the method shown in FIG. 3.

In contrast, as shown in FIG. 5, when a request 114 to access a file is made in the embodiment depicted in FIG. 2, the request 114 is received by VFS and then directed to the kernel-level FUSE module 222, which redirects the request 114 to the file-policy manager 204 where policy enforcement 500 is performed. As shown in FIG. 5 in connection with an "open" request that is granted access at 500, the granted request is propagated to the kernel level file system 108, which returns an "open result" indication that includes an LLFO-reference to the file object (the opened file). The process file tables described in connection with FIGS. 2 and 5 are not shown, but like the process file table in FIG. 7, each process file table includes an index to a reference as described below.

Referring to FIGS. 2 and 5, VFS places this LLFO-reference in a process file table associated with the file-policy manager 204, and a lower-level file descriptor (LLFD) is provided as an index to the LLFO-reference at 502. In other words, this lower-level file descriptor is captured at 502 by the file-policy manager 204, and an open response is propagated with the lower-level file descriptor to the FUSE module 222 so the FUSE module 222 may extract the LLFO-reference from the process file table of the file-policy manager 204 (using the LLFD as an index). The FUSE module 222 creates a FUSE file object (FFO) that includes the LLFO-reference, and VFS places an FFO-reference in a process table associated with a process of the application 110 so that a file descriptor is associated (as an index) to the FFO-reference.

As depicted as step 2 in FIG. 5, when an I/O operation (e.g., a write operation) is requested using the file descriptor as an index, the FFO-reference is obtained (from the process table associated with a process of the application 110). The LLFO-reference is then obtained from the FUSE file object (FFO)(a file object in memory created by the FUSE module 222); thus enabling the request to be sent to the file system 108 (using the obtained LLFO-reference) without a context change to user space.

Thus, in both the embodiments depicted in FIGS. 1 and 2, I/O file operations are performed using only kernel-level calls when access is granted (Block 310). As a consequence, policies are enforced in user space (where policies may be easily initiated and changed) while performance is enhanced because operations (e.g., read and write operations) that would be time consuming if redirected through user space go directly to the native filesystem instead.

Figure 6:
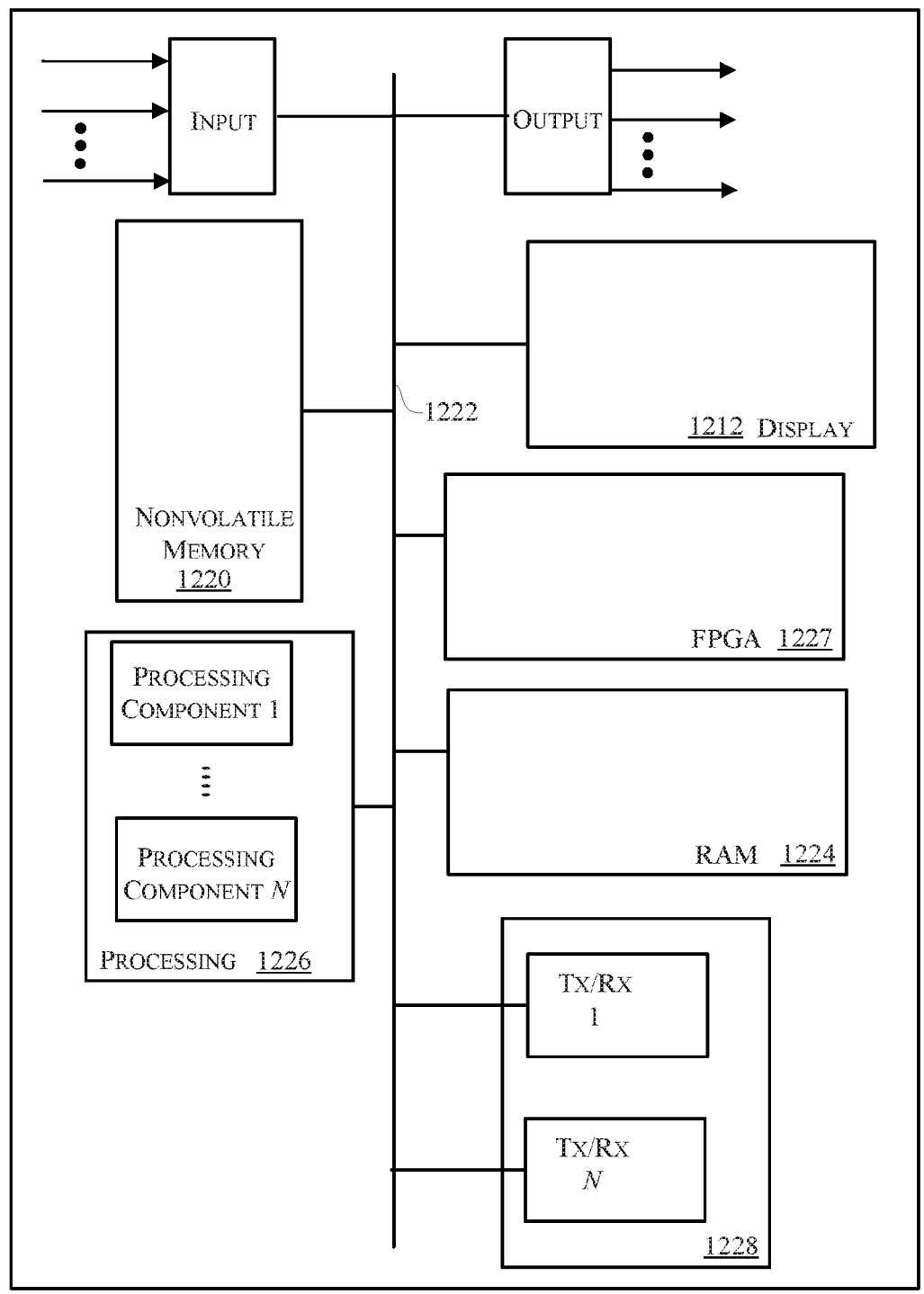
FIG. 6 is a diagram depicting physical components that may be used in connection with realizing embodiments described herein.

Referring to FIG. 6, shown is a block diagram depicting physical components that may be utilized to realize the one or more aspects of the embodiments disclosed herein. As shown, in this embodiment a display portion 1212 and nonvolatile memory 1220 are coupled to a bus 1222 that is also coupled to random access memory ("RAM") 1224, a processing portion (which includes N processing components) 1226, a field programmable gate array (FPGA) 1227, and a transceiver component 1228 that includes N transceivers. Although the components depicted in FIG. 6 represent physical components, FIG. 6 is not intended to be a detailed hardware diagram; thus many of the components depicted in FIG. 6 may be realized by common constructs or distributed among additional physical components. Moreover, it is contemplated that other existing and yet-to-be developed physical components and architectures may be utilized to implement the functional components described with reference to FIG. 6.

This display portion 1212 generally operates to provide a user interface for an operator of the computing device 100, 200. The display may be realized, for example, by a liquid crystal display or AMOLED display, and in several implementations, the display is realized by a touchscreen display to enable the operator of the computing device 100, 200 to enter file-access policies. In general, the nonvolatile memory 1220 is non-transitory memory that functions to store (e.g., persistently store) data and processor executable code (including executable code that is associated with effectuating the methods described herein). In some embodiments for example, the nonvolatile memory 1220 includes bootloader code, operating system code, file system code, and non-transitory processor-executable code to facilitate the execution of the functionality of the components described with reference to FIGS. 1 and 2.

In many implementations, the nonvolatile memory 1220 is realized by flash memory (e.g., NAND or ONENAND memory), but it is contemplated that other memory types may also be utilized. Although it may be possible to execute the code from the nonvolatile memory 1220, the executable code in the nonvolatile memory is typically loaded into RAM 1224 and executed by one or more of the N processing components in the processing portion 1226. In addition the file objects described herein may reside in RAM 1224. Both nonvolatile memory 1220 and RAM may be used to realize one or more of the storage devices depicted in the storage of FIGS. 1 and 2. In addition, the non-volatile memory 1220 may be utilized to realize the policy store 106 depicted in FIG. 1.

The N processing components in connection with RAM 1224 generally operate to execute the instructions stored in nonvolatile memory 1220 to enable the file system policy management described herein. For example, non-transitory processor-executable instructions to effectuate the file system policy management may be persistently stored in non-volatile memory 1220 and executed by the N processing components in connection with RAM 1224. As one of ordinarily skill in the art will appreciate, the processing portion 1226 may include a video processor, digital signal processor (DSP), graphics processing unit (GPU), and other processing components.

In addition, or in the alternative, the FPGA 1227 may be configured to effectuate one or more aspects of the methodologies described herein. For example, non-transitory FPGA-configuration-instructions may be persistently stored in nonvolatile memory 1220 and accessed by the FPGA 1227 (e.g., during boot up) to configure the FPGA 1227 to effectuate one or more functions of the components depicted in FIG. 1.

The depicted transceiver component 1228 includes N transceiver chains, which may be used for communicating with external devices via wireless or wireline networks. Each of the N transceiver chains may represent a transceiver associated with a particular communication scheme (e.g., WiFi, CDMA, Bluetooth, NFC, etc.). The transceiver chains may be utilized to receive video frames that are processed (encoded or decoded) as described herein, and may be used to send video frames to another device.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for managing file access control policies on a computing device, the method comprising:
   receiving, at a stackable policy file system that comprises code executable by a processor in a kernel level of the computing device, from an application in user space of the computing device, a request to access a file on a hardware storage device of the computing device;
   directing the request, as a redirected request, from the stackable policy file system at the kernel level of the computing device to a file-policy manager in user space of the computing device without enforcing file-access policies;
   receiving the redirected request for access at the file-policy manager in user-space;
   enforcing a file-access policy with the file-policy manager in user space to grant or deny access to the file on the computing device;
   providing, with the file-policy manager, in response to the requested operation being allowed, a grant-indicator;
   receive the grant indicator with the stackable policy file system in the kernel level of the computing device;
   send a file operation request directly from the stackable policy file system to a kernel-level file system;
   receive a lower-level file object (LLFO) reference at the stackable policy file system from the kernel-level file system that points to a lower level file object;
   provide a stackable policy file object (SPFO) reference with the stackable policy file system that points to a stackable-policy file object; and
   placing the SPFO reference in a file table associated with a process of the application to enable file operations on the file on the computing device using only kernel-level calls when access to the file is granted.

2. The method of claim 1, including receiving file-access policy updates from an operator and updating file-access policies in user space.

3. The method of claim 1, wherein the request to access the file is a request selected from the group consisting of: an open, create, open-directory, set-attribute, and lookup/stat request.

4. The method of claim 1, wherein the file operations are operations selected from the group consisting of a read, write, memory-mapped I/O, readdir, seekdir, seek, and an input/output control operation.

5. A computing device comprising:
   at least one hardware storage device configured to store files;
   a kernel-level file system comprising processor-executable code configured to enable operations on the stored files;
   at least one application configured to send a request for access to one or more of the stored files;
   a stackable policy file system comprising processor executable code configured to operate at the kernel-level, and the stackable policy file system is configured to:
      receive the request for access to one or more of the stored files;
      redirect the request for access to user-space as a redirected request without enforcing file-access policies;
   a file-policy manager comprising processor executable code configured to:
      receive the redirected request for access in user-space and enforce file-access policies in user space to grant or deny access to the stored files; and
      determine whether the stored file policies in a policy store allow or prohibit the requested operation;
      provide, in response to the requested operation being allowed, a grant-indicator;
   wherein the stackable policy file system is configured to;
      receive the grant indicator and send a file operation request directly to the kernel-level-file-system;
      receive a lower-level file object (LLFO) reference from the kernel-level file system that points to a lower level file object;
      provide a stackable policy file object (SPFO) reference that points to a stackable-policy file object; and
   a virtual-file-system comprising processor executable code configured to place the SPFO reference in a file table associated with a process of the application to enable the application to perform input/output operations on the one or more files with the kernel-level file system without communicating with the user space.

6. The computing device of claim 5, including a policy store in user space configured to enable users to update file-access policies in the policy store.

7. The computing device of claim 5, wherein the kernel-level file system is selected from the group consisting of fourth extended file system (EXT4), file allocation table (FAT), and a network file system (NFS).

8. A non-transitory, tangible processor readable storage medium, encoded with processor readable instructions to perform a method for managing file access control policies on a computing device, the method comprising:
   receiving, at a stackable policy file system that comprises code executable by a processor in a kernel level of the computing device, from an application in user space of the computing device, a request to access a file on a hardware storage device of the computing device;
   directing the request, as a redirected request, from the stackable policy file system at the kernel level of the computing device to a file-policy manager in user space of the computing device without enforcing file-access policies;
   receiving the redirected request for access at the file-policy manager in user-space;
   enforcing a file-access policy with the file-policy manager in user space to grant or deny access to the file on the computing device;
   providing, with the file-policy manager, in response to the requested operation being allowed, a grant-indicator;

receive the grant indicator with the stackable policy file system in the kernel level of the computing device;

send a file operation request directly from the stackable policy file system to a kernel-level file system;

receive a lower-level file object (LLFO) reference at the stackable policy file system from the kernel-level file system that points to a lower level file object;

provide a stackable policy file object (SPFO) reference with the stackable policy file system that points to a stackable-policy file object; and placing the SPFO reference in a file table associated with a process of the application to enable file operations on the file on the computing device using only kernel-level calls when access to the file is granted.

9. The non-transitory, tangible processor readable storage medium of claim 8, the method including receiving file-access policy updates from an operator and updating the file-access policies.

10. The non-transitory, tangible processor readable storage medium of claim 8, wherein the request to access the file is a request selected from the group consisting of: an open, create, open-directory, set-attribute, and lookup/stat request.

11. The non-transitory, tangible processor readable storage medium of claim 8, wherein the file operations are operations selected from the group consisting of a read, write, memory-mapped I/O, readdir, seekdir, seek, and an input/output control operation.

* * * * *